(12) United States Patent
Armstrong et al.

(10) Patent No.: US 8,580,456 B2
(45) Date of Patent: Nov. 12, 2013

(54) PHASE STABLE DOPED ZIRCONIA ELECTROLYTE COMPOSITIONS WITH LOW DEGRADATION

(75) Inventors: Tad Armstrong, Burlingame, CA (US); Emad El Batawi, Sunnyvale, CA (US); Martin Janousek, Sunnyvale, CA (US); Manoj Pillai, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 360 days.

(21) Appl. No.: 13/009,085

(22) Filed: Jan. 19, 2011

(65) Prior Publication Data

US 2011/0183233 A1 Jul. 28, 2011

Related U.S. Application Data

(60) Provisional application No. 61/298,468, filed on Jan. 26, 2010.

(51) Int. Cl.
*H01M 8/12* (2006.01)

(52) U.S. Cl.
USPC .................................... 429/496; 429/482

(58) Field of Classification Search
USPC ............................... 429/496, 482
See application file for complete search history.

(56) References Cited

U.S. PATENT DOCUMENTS

| | | | |
|---|---|---|---|
| 4,052,532 A | 10/1977 | Tannenberger | |
| 4,272,353 A | 6/1981 | Lawrance et al. | |
| 4,426,269 A | 1/1984 | Brown et al. | |
| 4,459,340 A | 7/1984 | Mason | |
| 4,575,407 A | 3/1986 | Diller | |
| 4,686,158 A | 8/1987 | Nishi et al. | |
| 4,792,502 A | 12/1988 | Trocciola et al. | |
| 4,804,592 A | 2/1989 | Vanderborgh et al. | |
| 4,847,173 A | 7/1989 | Mitsunnaga et al. | |
| 4,898,792 A | 2/1990 | Singh et al. | |
| 4,913,982 A | 4/1990 | Kotchick et al. | |
| 4,917,971 A | 4/1990 | Farooque | |
| 4,925,745 A | 5/1990 | Remick et al. | |
| 4,983,471 A | 1/1991 | Reichner et al. | |
| 5,034,287 A | 7/1991 | Kunz | |
| 5,047,299 A | 9/1991 | Shockling | |

(Continued)

FOREIGN PATENT DOCUMENTS

| CN | 101147285 A | 3/2008 |
|---|---|---|
| CN | 101295792 A | 10/2008 |

(Continued)

OTHER PUBLICATIONS

International Search Report issued in PCT Application PCT/US2011/021664, mailed Sep. 28, 2011.

(Continued)

*Primary Examiner* — Milton I Cano
*Assistant Examiner* — Brent Thomas
(74) *Attorney, Agent, or Firm* — The Marbury Law Group PLLC

(57) ABSTRACT

A solid oxide fuel cell (SOFC) includes a cathode electrode, a solid oxide electrolyte, and an anode electrode. The electrolyte and/or electrode composition includes zirconia stabilized with (i) scandia, (ii) ceria, and (iii) at least one of yttria and ytterbia. The composition does not experience a degradation of ionic conductivity of greater than 15% after 4000 hrs at a temperature of 850° C.

3 Claims, 4 Drawing Sheets

(56) References Cited

U.S. PATENT DOCUMENTS

| | | |
|---|---|---|
| 5,143,800 A | 9/1992 | George et al. |
| 5,162,167 A | 11/1992 | Minh et al. |
| 5,169,730 A | 12/1992 | Reichner et al. |
| 5,170,124 A | 12/1992 | Blair et al. |
| 5,171,645 A | 12/1992 | Khandkar |
| 5,192,334 A | 3/1993 | Rohr et al. |
| 5,213,910 A | 5/1993 | Yamada |
| 5,215,946 A | 6/1993 | Minh |
| 5,256,499 A | 10/1993 | Minh et al. |
| 5,273,837 A | 12/1993 | Aiken et al. |
| 5,290,323 A | 3/1994 | Okuyama et al. |
| 5,290,642 A | 3/1994 | Minh et al. |
| 5,302,470 A | 4/1994 | Okada et al. |
| 5,342,705 A | 8/1994 | Minh et al. |
| 5,368,667 A | 11/1994 | Minh et al. |
| 5,441,821 A | 8/1995 | Merritt et al. |
| 5,498,487 A | 3/1996 | Ruka et al. |
| 5,501,914 A | 3/1996 | Satake et al. |
| 5,505,824 A | 4/1996 | McElroy |
| 5,518,829 A | 5/1996 | Satake et al. |
| 5,527,631 A | 6/1996 | Singh et al. |
| 5,573,867 A | 11/1996 | Zafred et al. |
| 5,589,017 A | 12/1996 | Minh |
| 5,589,285 A | 12/1996 | Cable et al. |
| 5,601,937 A | 2/1997 | Isenberg |
| 5,686,196 A | 11/1997 | Singh et al. |
| 5,688,609 A | 11/1997 | Rostrup-Nielsen et al. |
| 5,733,675 A | 3/1998 | Dederer et al. |
| 5,741,406 A | 4/1998 | Barnett |
| 5,741,605 A | 4/1998 | Gillett et al. |
| 5,922,488 A | 7/1999 | Marucchi-Soos et al. |
| 5,942,349 A * | 8/1999 | Badwal et al. ................ 429/495 |
| 5,955,039 A | 9/1999 | Dowdy |
| 5,993,989 A | 11/1999 | Baozhen |
| 6,013,385 A | 1/2000 | DuBose |
| 6,051,125 A | 4/2000 | Pham et al. |
| 6,106,964 A | 8/2000 | Voss et al. |
| 6,228,521 B1 | 5/2001 | Kim et al. |
| 6,238,816 B1 | 5/2001 | Cable et al. |
| 6,280,865 B1 | 8/2001 | Eisman et al. |
| 6,287,716 B1 | 9/2001 | Hashimoto et al. |
| 6,329,090 B1 | 12/2001 | McElroy et al. |
| 6,361,892 B1 | 3/2002 | Ruhl et al. |
| 6,403,245 B1 | 6/2002 | Hunt |
| 6,436,562 B1 | 8/2002 | DuBose et al. |
| 6,451,466 B1 | 9/2002 | Grasso et al. |
| 6,489,050 B1 | 12/2002 | Ruhl et al. |
| 6,495,279 B1 | 12/2002 | Bogicevic et al. |
| 6,558,831 B1 | 5/2003 | Doshi et al. |
| 6,582,845 B2 | 6/2003 | Helfinstine et al. |
| 6,592,965 B1 | 7/2003 | Gordon |
| 6,605,316 B1 | 8/2003 | Visco |
| 6,623,880 B1 | 9/2003 | Geisbrecht et al. |
| 6,677,070 B2 | 1/2004 | Kearl |
| 6,682,842 B1 | 1/2004 | Visco et al. |
| 6,767,662 B2 | 7/2004 | Jacobson |
| 6,787,261 B2 | 9/2004 | Ukai et al. |
| 6,803,141 B2 | 10/2004 | Pham |
| 6,811,913 B2 | 11/2004 | Ruhl |
| 6,821,663 B2 | 11/2004 | McElroy et al. |
| 6,854,688 B2 | 2/2005 | McElroy et al. |
| 6,924,053 B2 | 8/2005 | McElroy |
| 6,972,161 B2 | 12/2005 | Beatty et al. |
| 6,979,511 B2 | 12/2005 | Visco |
| 7,150,927 B2 | 12/2006 | Hickey et al. |
| 7,157,173 B2 | 1/2007 | Kwon |
| 7,255,956 B2 | 8/2007 | McElroy |
| 7,494,732 B2 | 2/2009 | Roy |
| 7,550,217 B2 | 6/2009 | Kwon |
| 7,563,503 B2 | 7/2009 | Gell |
| 7,601,183 B2 | 10/2009 | Larsen |
| 2001/0049035 A1 | 12/2001 | Haltiner, Jr. et al. |
| 2002/0012825 A1 | 1/2002 | Sasahara et al. |
| 2002/0014417 A1 | 2/2002 | Kuehnle et al. |
| 2002/0028362 A1 | 3/2002 | Prediger et al. |
| 2002/0028367 A1 | 3/2002 | Sammes et al. |
| 2002/0058175 A1 | 5/2002 | Ruhl |
| 2002/0098406 A1 | 7/2002 | Huang et al. |
| 2002/0106544 A1 | 8/2002 | Noetzel et al. |
| 2002/0127455 A1 | 9/2002 | Pham et al. |
| 2002/0132156 A1 | 9/2002 | Ruhl et al. |
| 2003/0162067 A1 | 8/2003 | McElroy |
| 2003/0165732 A1 | 9/2003 | McElroy |
| 2003/0196893 A1 | 10/2003 | McElroy |
| 2004/0081859 A1 | 4/2004 | McElroy et al. |
| 2004/0191595 A1 | 9/2004 | McElroy et al. |
| 2004/0191597 A1 | 9/2004 | McElroy |
| 2004/0191598 A1 | 9/2004 | Gottmann et al. |
| 2004/0202914 A1 | 10/2004 | Sridhar et al. |
| 2004/0224193 A1 | 11/2004 | Mitlitsky et al. |
| 2004/0229031 A1 | 11/2004 | Gell et al. |
| 2004/0265484 A1 | 12/2004 | Pham et al. |
| 2005/0048334 A1 | 3/2005 | Sridhar et al. |
| 2005/0074650 A1 | 4/2005 | Sridhar et al. |
| 2005/0164051 A1 | 7/2005 | Venkataraman et al. |
| 2005/0227134 A1 | 10/2005 | Nguyen |
| 2005/0271919 A1 | 12/2005 | Hata et al. |
| 2006/0008682 A1 | 1/2006 | McLean et al. |
| 2006/0040168 A1 | 2/2006 | Sridhar |
| 2006/0110633 A1 * | 5/2006 | Ukai et al. ................ 429/12 |
| 2006/0166070 A1 | 7/2006 | Hickey et al. |
| 2006/0199057 A1 * | 9/2006 | Hiwatashi ................ 429/30 |
| 2006/0216575 A1 | 9/2006 | Cassidy |
| 2006/0222929 A1 | 10/2006 | Hickey et al. |
| 2007/0045125 A1 | 3/2007 | Hartvigsen et al. |
| 2007/0082254 A1 | 4/2007 | Hiwatashi |
| 2007/0141422 A1 | 6/2007 | Brown |
| 2007/0141423 A1 | 6/2007 | Suzuki |
| 2007/0141443 A1 | 6/2007 | Brown |
| 2007/0141444 A1 | 6/2007 | Brown |
| 2007/0224481 A1 | 9/2007 | Suzuki et al. |
| 2007/0237999 A1 | 10/2007 | Donahue |
| 2007/0275292 A1 | 11/2007 | Sin Xicola et al. |
| 2007/0287048 A1 | 12/2007 | Couse |
| 2008/0029388 A1 | 2/2008 | Elangovan |
| 2008/0075984 A1 | 3/2008 | Badding |
| 2008/0076006 A1 | 3/2008 | Gottmann et al. |
| 2008/0096080 A1 | 4/2008 | Batawi |
| 2008/0102337 A1 | 5/2008 | Shimada |
| 2008/0254336 A1 | 10/2008 | Batawi |
| 2008/0261099 A1 | 10/2008 | Nguyen |
| 2009/0029195 A1 | 1/2009 | Gauckler |
| 2009/0068533 A1 | 3/2009 | Fukasawa et al. |
| 2009/0186250 A1 | 7/2009 | Narendar et al. |
| 2009/0214919 A1 | 8/2009 | Suzuki |
| 2009/0291347 A1 | 11/2009 | Suzuki |
| 2009/0305106 A1 | 12/2009 | Gell et al. |
| 2011/0039183 A1 | 2/2011 | Armstrong et al. |

FOREIGN PATENT DOCUMENTS

| | | |
|---|---|---|
| GB | 1048839 A | 11/1966 |
| JP | 3196465 A | 8/1991 |
| JP | 6215778 | 8/1994 |
| JP | 2000-340240 | 8/2000 |
| JP | 2000-281438 | 10/2000 |
| JP | 2008-305804 | 12/2008 |
| KR | 20020092223 A | 12/2002 |
| KR | 20070095440 A | 9/2007 |
| KR | 20080010737 A | 1/2008 |
| KR | 20080097971 | 11/2008 |
| KR | 100886239 B1 | 2/2009 |
| KR | 20090061870 A | 6/2009 |
| WO | WO2004/093214 | 10/2004 |
| WO | WO2005/041329 | 5/2005 |
| WO | WO2008/019926 | 2/2008 |
| WO | WO2009/097110 | 8/2009 |

OTHER PUBLICATIONS

International Preliminary Report on Patentability issued in PCT Application No. PCT/US2011/021664, mailed on Aug. 9, 2012.

Ahmad-Khantou et al., "Electrochemical & Microstructural Study of SOFC Cathodes Based on $La_{0.5}Sr_{0.3}MnO_3$ and $Pr_{0.65}Sr_{0.3}MnO_3$,"

(56) References Cited

OTHER PUBLICATIONS

Electrochemical Society Proceedings, 2001, p. 476-485, vol. 2001-16.

Mori et al., "Lanthanum Alkaline-Earth Manganites as a Cathode Material in High-Temperature Solid Oxide Fuel Cells," Journal of the Electrochemical Society, 1999, p. 4041-4047, vol. 146.

L.G. Austin, "Cell & Stack Construction: Low Temperature Cells," NASA SP-120, 1967.

EG & G Services, Parsons, Inc., SAIC, Fuel Cell Handbook, 5th Edition, USDOE, Oct. 2000, p. 9-1-9.4, and 9-12-9-14.

J.M. Sedlak, et al., "Hydrogen Recovery and Purification Using the Solid Polymer Electrolyte Electrolysis Cell," Int. J. Hydrogen Energy, vol. 6, p. 45-51, 1981.

Dr. Ruhl, "Low Cost Reversible Fuel Cell System," Proceedings of the 2000 U.S. DOE Hydrogen Program Review, Jun. 15, 2000, NREL/CP-570-30535.

Low Cost, Compact Solid Oxide Fuel Cell Generator, NASA Small Business Innovation Research Program.

Low Cost, High Efficiency Reversible Fuel Cell (and Electrolyzer) Systems, Proceedings of the 2001 DOE Hydrogen Program Review NREL/CP-570-30535.

Milliken et al., "Low Cost, High Efficiency Reversible Fuel Cell Systems," Proceedings of the 2002 U.S. DOE Hydrogen Program Review, NREL/CP-610-32405.

K. Eguchi et al., Power Generation and Steam Electrolysis Characteristics of an Electrochemical Cell with a Zirconia or Ceria based Electrode, Solid State Ionics, 86 88, 1996, p. 1245-49.

F. Mitlitsky et al., "Regenerative Fuel Cells for High Altitude Long Endurance Solar Powered Aircraft," $28^{th}$ Intersociety Energy Conversion Engineering Conference (IECED), Jul. 28, 1993, UCRL-JC-113485.

Small, Ultra Efficient Fuel Cell Systems, Advanced Technology Program, ATP 2001 Competition, Jun. 2002.

F. Mitlitsky et al., Unitized Regenerative Fuel Cells for Solar Rechargeable Aircraft and Zero Emission Vehicles, 1994 Fuel Cell Seminar, Sep. 6, 1994, UCRL-JC-117130.

Ralph et al., "Cathode Materials for Reduced-Temperature SOFCs," Journal of the Electrochemical Society, 2003, p. A1518-A1522, vol. 150.

Simmer et al., "Development of Fabrication Techniques and Electrodes for Solid Oxide Fuel Cells," Electrochemcial Society Proceedings, p. 1050-1061, vol. 2001-16.

Yamamoto et al., "Electrical Conductivity of Stabilized Zirconia with Ytterbia and Scandia," Solid State Ionics, v79, p. 137-142, Jul. 1995.

Araki et al., "Degradation Mechanism of Scandia-Stabilized Zirconia Electrolytes: Discussion based on Annealing Effects on Mechanical Strength, Ionic Conductivity, and Raman Spectrum," Solid State Ionics, v180, n28-31, p. 1484-1489, Nov. 2009.

Lybye et al., "Effect of Transition Metal Ions on the Conductivity and Stability of Stabilized Zirconia," Ceramic Engineering and Science Proceedings, v27, n4, p. 67-78, 2006.

* cited by examiner

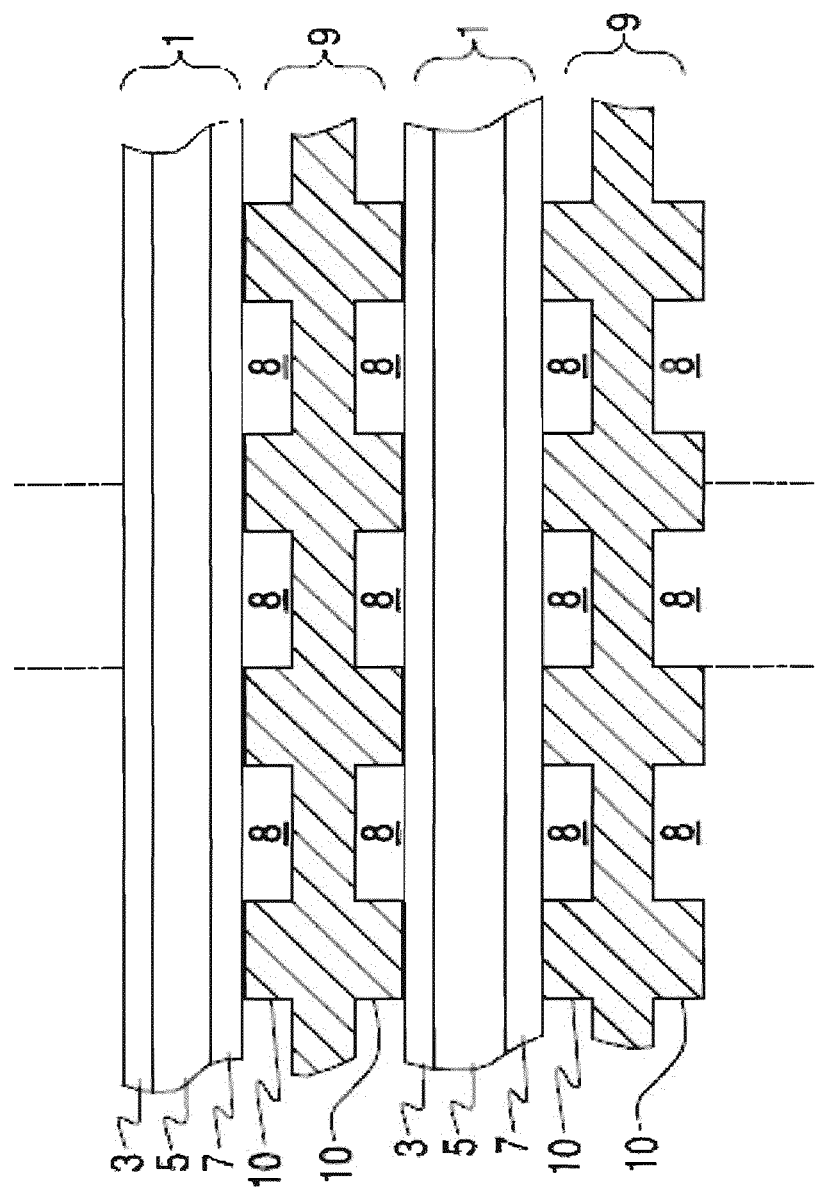

PHASE STABLE DOPED ZIRCONIA ELECTROLYTE COMPOSITIONS WITH LOW DEGRADATION

CROSS REFERENCE TO RELATED PATENT APPLICATION

This application claims the benefit of U.S. Provisional Application No. 61/298,468, filed Jan. 26, 2010, incorporated herein by reference in its entirety.

BACKGROUND OF THE INVENTION

The present invention is generally directed to fuel cell components, and to solid oxide fuel cell electrolyte materials in particular.

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 650° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A solid oxide reversible fuel cell (SORFC) system generates electrical energy and reactant product (i.e., oxidized fuel) from fuel and oxidizer in a fuel cell or discharge mode and generates the fuel and oxidant using electrical energy in an electrolysis or charge mode.

Scandia stabilized zirconia (SSZ) SOFC electrolyte material exhibits a high oxygen ion conductivity. Typically, zirconia is doped with between 8 and 11 mol % scandia ($Sc_2O_3$) in order to stabilize the cubic phase zirconia at high SOFC operating temperature of 650-850° C.

However, there are two problems with SSZ electrolyte materials: 1) they exhibit a cubic to rhombohedral phase transformation at around 580° C., and 2) the ionic conductivity slowly decreases with time, which is known as ageing.

Others have shown that co-doping SSZ with one secondary rare earth oxide will suppress the cubic to rhombohedral phase transformation. For example, 10Sc1Ce zirconia (10 mol % $Sc_2O_3$-1 mol % $CeO_2$-zirconia) and 10Sc1Y (1 mol % $Sc_2O_3$-1 mol % $Y_2O_3$-zirconia) are examples of co-doped zirconia compositions that do not exhibit the cubic to rhombohedral phase transformation.

However, both of these zirconia compositions still experience ageing (i.e., the a slow decrease in ionic conductivity with time at the SOFC operating temperatures of 800-850 C). Although the actual mechanism of this ageing degradation in ionic conductivity with time is not agreed upon in the scientific literature, one hypothesis is that the cubic phase is not stable and slowly decomposes into a tetragonal phase which has a lower ionic conductivity. The resulting material consists of a two-phase mixture primarily of cubic phase with small domains (e.g., 2-5 nm) of tetragonal phase. As shown in FIGS. 1 and 2, the 10Sc1Ce zirconia may exhibit a faint superlattice of tetragonal phase as well as the cubic fluorite structure of zirconia.

SUMMARY OF THE INVENTION

One embodiment of the invention provides an electrolyte and/or electrode composition for a solid oxide fuel cell which includes zirconia stabilized with (i) scandia, (ii) ceria, and (iii) at least one of yttria and ytterbia. Preferably, the at least one of yttria and ytterbia is present in an amount greater than 0 and equal to or less than 2.5 mol %.

Another embodiment of the invention provides a scandia stabilized zirconia electrolyte composition for a solid oxide fuel cell, comprising a formula $(ZrO_2)_{1-w-x-z}(Sc_2O_3)_w(CeO_2)_x(Y_2O_3)_a(Yb_2O_3)_b$, where $0.09 \leq w \leq 0.11$; $0 < x \leq 0.025$; $a+b=z$; $0 \leq z \leq 0.025$; and $x+z \geq 0.02$. Another embodiment of the invention provides a scandia stabilized zirconia electrolyte composition for a solid oxide fuel cell, comprising a formula $(ZrO_2)_{1-w-x-z}(Sc_2O_3)_w(CeO_2)_x(Y_2O_3)_a(Yb_2O_3)_b$, where $0.09 \leq w \leq 0.11$; $0 \leq x \leq 0.0125$; $a+b=z$, and $0.0025 \leq z \leq 0.02$; and $x+z \geq 0.02$.

Another embodiment of the invention provides a method of operating a solid oxide fuel cell comprising a zirconia electrolyte stabilized with scandia and ceria. The method comprises operating the solid oxide fuel cell for at least 4000 hrs such that an electrolyte of the fuel cell does not experience a degradation of ionic conductivity of greater than 15%.

BRIEF DESCRIPTION OF THE DRAWINGS

FIG. 4 is a cross-sectional view of a solid oxide fuel cell according to an embodiment of the invention and FIG. 5 is a side cross sectional view of a SOFC stack according to an embodiment of the invention.

DETAILED DESCRIPTION OF THE EMBODIMENTS

Figure 2:
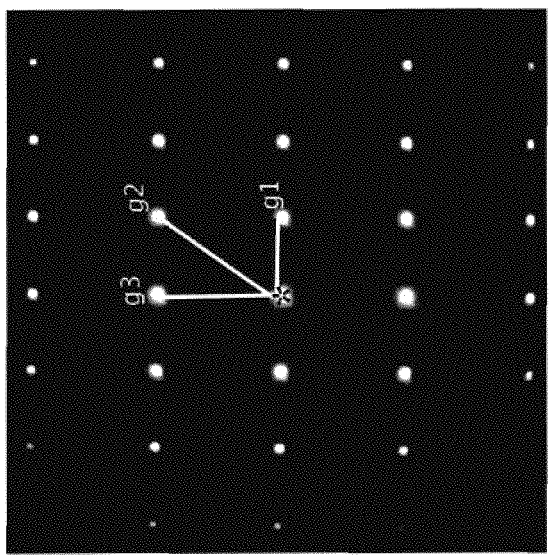
FIG. 2 is a contrast enhanced selected area electron diffraction pattern of prior art 10Sc1Ce zirconia. The zone axis is of type <112> for cubic zirconia.
Figure 1:
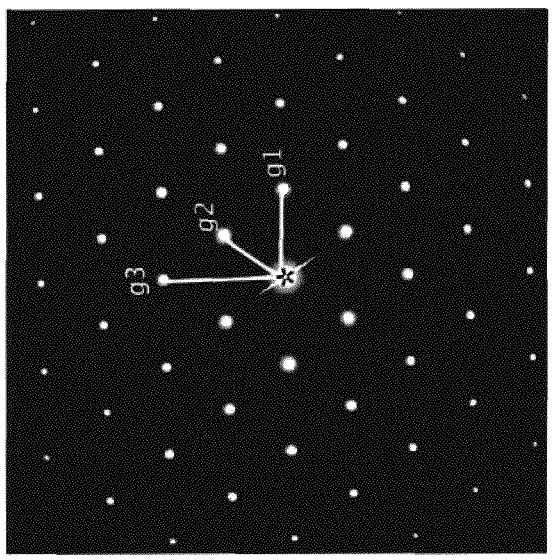
FIG. 1 is a contrast enhanced selected area electron diffraction pattern of prior art 10Sc1Ce zirconia. The zone axis is of type <110> for cubic zirconia.

Without wishing to be bound by a particular theory, the present inventors believe that the 10Sc1Ce composition is slightly under-doped and is not fully stable (i.e., not sufficiently stabilized), and thus is prone to ageing due to the slow cubic to tetragonal phase decomposition or transformation at high temperature.

According to a first embodiment of the invention, the SSZ composition contains at least 2 molar percent of the additional stabilizing oxide (such as ceria, yttria and/or ytterbia) to provide sufficient stabilization to the SSZ composition to reduce or prevent the ageing decomposition. The stabilizing oxide provides the stabilization of the cubic phase of SSZ and thus the suppression of the cubic to tetragonal phase transformation. According to a second embodiment, both ceria and at least one of yttria and ytterbia are added to the SSZ composition to reduce or prevent the ageing decomposition. The addition of both ceria and at least one of yttria and ytterbia provides the stabilization of the cubic phase of SSZ and thus the suppression of the cubic to tetragonal phase transformation. One exemplary composition of these embodiments is zirconia has been co-doped with at least two additional elements: 10Sc1Ce1Y (10 mol % $Sc_2O_3$-1 mol % $CeO_2$-1 mol % $Y_2O_3$-zirconia). According to a third embodiment, the SSZ composition has a coefficient of thermal expansion ("CTE") close to that of interconnects which will be used in a fuel cell stack with the SSZ electrolyte SOFCs. The interconnects may comprise chromium alloy interconnects having at least 94 wt % Cr, 4-6 wt % Fe and 0-1 wt % Y. In a first aspect of the third embodiment, the SSZ composition contains greater than zero but less than 2 mol % total of ceria, yttria and/or ytterbia, such as 1-2 mol % total of ceria and at least one of yttria and/or ytterbia. By slightly reducing the amount of at least one of ceria, yttria and/or ytterbia, the CTE of the electrolyte is increased such that it differs from the CTE of the interconnect by 10% or less, such as 5% or less, such as 0-1%, without decreasing the stability or ageing degradation resistance of the electrolyte. In a second aspect of the third embodiment, the yttria is replaced with ytterbia. It is believed that replacing yttria with ytterbia should increase the CTE and ion conductivity of the electrolyte material. Thus, the electrolyte compositions of the third embodiment are believed to exhibit improved beginning of life ionic conductivity, low degradation and higher CTE that is the same as or slightly different from a CTE of a Cr alloy interconnect. A decrease in difference in CTE between SOFC electrolytes and interconnects in a SOFC stack should result in decreased thermally induced stress and damage to the stack components. Preferably, the electrolyte composition of all three embodiments is homogeneous throughout its height, width and thickness rather than being a heterogeneous composite of yttria and scandia stabilized zirconias made by mixing of yttria and scandia stabilized zirconia powders.

Accordingly, the first embodiment of the invention provides a SOFC electrolyte composition which comprises zirconia stabilized with (i) scandia, (ii) ceria, and (iii) at least one of yttria and ytterbia. Scandia may be present in an amount equal to 9 to 11 mol %, such as 10 mol %, ceria may present in amount greater than 0 (e.g., at least 0.5 mol %) and equal to or less than 2.5 mol %, such as 1 mol %, and at least one of yttria and ytterbia may be present in an amount greater than 0 and equal to or less than 2.5 mol %, such as 1 mol %.

In one aspect of the first embodiment, the at least one of yttria and ytterbia comprises yttria. In another aspect of the first embodiment, the at least one of yttria and ytterbia comprises ytterbia. In yet another aspect of the first embodiment, the at least one of yttria and ytterbia comprises both yttria and ytterbia. In this aspect, yttria may comprise 0.5 to 1.5 mol % and ytterbia may comprise 1.5 to 0.5 mol % of the composition such that the total yttria and ytterbia content is greater than 0.5 mol % and less than 2.5 mol %. The amount of scandia is greater than the amount of ceria and the amount of the at least one of yttria and ytterbia. The amount of ceria may be equal to, less than or greater than the amount of the at least one of yttria and ytterbia.

In the second embodiment of the present invention, the amount of stabilizing oxide, such as ceria, is at least 2 mol % to provide sufficient stabilization to the SSZ composition to reduce or avoid ageing. In this embodiment, the yttria and/or ytterbia is optionally added to the composition and may be omitted.

Thus, the SSZ electrolyte composition of both the first and the second embodiment may have the formula (1):

$$(ZrO_2)_{1-w-x-z}(Sc_2O_3)_w(CeO_2)_x(Y_2O_3)_a(Yb_2O_3)_b \qquad (1),$$

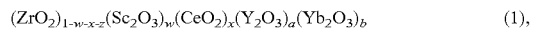

where w is from about 0.09 to 0.11, x is from greater than 0 to 0.025, the total of a and b equal to z, and z is from 0 to 0.025, and the total of x plus z is greater than or equal to 0.02. In other words, 0.09≤w≤0.11; 0≤x≤0.025; a+b=z, and 0≤z≤0.025; and x+z≥0.02. Preferably, x ranges from 0.005 to 0.025, z ranges from 0.005 to 0.025, and the total of x and z is greater than or equal to 0.02 and less than or equal to 0.03. In other words, 0.005≤x≤0.025; 0.005≤z≤0.025; and 0.02≤(x+z)≤0.03. More preferably, w=0.1; x=0.01; and z=0.01. Thus, w may be about 10 mol %, x may be about 1 mol %, and z may be about 1 mol %. In formula (1), b may be less than a (i.e., b<a), a may be less than b (i.e., a<b), a may be equal to zero (i.e. a=0), b may be equal to zero (i.e., b=0), or a may be equal to b (i.e., a=b)

According to the third embodiment, the SSZ composition has a relatively higher coefficient of thermal expansion ("CTE") close to that of interconnects which will be used in a fuel cell stack with the SSZ electrolyte SOFCs. The interconnects may comprise chromium alloy interconnects having at least 94 wt % Cr, 4-6 wt % Fe and 0-1 wt % Y. In a first aspect of the third embodiment, the SSZ composition contains greater than zero but less than 2 mol % total of ceria and at least one of yttria and/or ytterbia. For example, the SSZ composition contains 0.5 to 1.75 mol % total, such as 0.5 to 1.5 mol % total, including 1 to 1.5 mol % total of ceria and at least one of yttria and/or ytterbia. The SSZ composition may contain 0.25 to 1.25 mol % ceria, such as 0.5 to 1 mol % ceria, and 0.25 to 1.25 mol %, such as 0.5 to 1 mol % of yttria, ytterbia or a combination of yttria and ytterbia. In a second aspect of the third embodiment, the yttria is replaced with ytterbia such that the composition contains substantially no yttria (e.g., an unavoidable trace amount of yttria or less than 0.1 mol % yttria). It is believed that replacing yttria with ytterbia should increase the CTE and ion conductivity of the electrolyte material. The SSZ composition may contain 0 to 1.25 mol % ceria, such as 0.5 to 1 mol % ceria, and 0.25 to 2 mol %, such as 0.5 to 1 mol % of ytterbia. The SSZ composition may contain substantially no ceria (e.g., an unavoidable trace amount of ceria or less than 0.1 mol % ceria) if the composition contains at least 0.75 mol % ytterbia, such as 1 to 2 mol % ytterbia, including 1 to 1.5 mol % ytterbia. Thus, in the second aspect of the third embodiment, the electrolyte composition for a solid oxide fuel cell includes zirconia stabilized with: (i) scandia present in an amount equal to 9 to 11 mol %, and (ii) ytterbia present in an amount equal to 1 to 2 mol %.

Thus, the SSZ electrolyte composition of the third embodiment may have the formula (2):

$$(ZrO_2)_{1-w-x-z}(Sc_2O_3)_w(CeO_2)_x(Y_2O_3)_a(Yb_2O_3)_b \qquad (2),$$

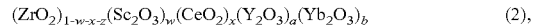

where w is from about 0.09 to 0.11, x is from 0 to 0.0125, a is from 0 to 0.0125, b is from 0 to 0.02, the total of a and b equal to z, and z is from 0.0025 to 0.02, and the total of x plus z is less than or equal to 0.02. In other words, 0.09≤w≤0.11; 0≤x≤0.0125; a+b=z, and 0.0025≤z≤0.02; and x+z≤0.02. Preferably, in the first aspect of the third embodiment, x ranges from 0.0025 to 0.0125, such as 0.005 to 0.01, z ranges from 0.0025 to 0.0125, such as 0.005 to 0.01, and the total of x and z is greater than or equal to 0.005 and less than or equal to 0.0175, such as greater than or equal to 0.01 and less than or equal to 0.015. In other words, 0.0025≤x≤0.0125, such as 0.005≤x≤0.01; 0.0025≤z≤0.0125, such as 0.005≤z≤0.01, and 0.005≤(x+z)≤0.0175, such as 0.01≤(x+z)≤0.015. More preferably, w=0.1; x=0.01 when z=0.005, and x=0.005 when z=0.01. Thus, w may be about 10 mol %, x may be about 0.5 to 1 mol %, and z may be about 0.5 to 1 mol %. Preferably in the second aspect of the third embodiment, x ranges from 0 to 0.0125, such as 0.005 to 0.01, $0 \leq a \leq 0.001$ (preferably $a=0$), and b and z range from 0.0025 to 0.02, such as 0.005 to 0.01, and the total of x and z is greater than or equal to 0.005 and less than or equal to 0.02, such as 0.01 to 0.015. In formula (2), b may be less than a (i.e., b<a), a may be less than b (i.e., a<b), a may be equal to zero (i.e. $a=0$), b may be equal to zero (i.e., $b=0$), or a may be equal to b (i.e., $a=b$). Preferably, only one of a or b equals zero. Exemplary compositions according to the third embodiment include:

10Sc1Ce1Y (10 mol % $Sc_2O_3$+1 mol % $CeO_2$+1 mol % $Y_2O_3$), remainder zirconia;
10Sc1Ce0.5Y (10 mol % $Sc_2O_3$+1 mol % $CeO_2$+0.5 mol % $Y_2O_3$), remainder zirconia;
10Sc1Ce1Yb (10 mol % $Sc_2O_3$+1 mol % $CeO_2$+1 mol % $Yb_2O_3$), remainder zirconia;
10Sc1Ce0.5Yb (10 mol % $Sc_2O_3$+1 mol % $CeO_2$+0.5 mol % $Yb_2O_3$), remainder zirconia;
10Sc0.5Ce0.5Y (10 mol % $Sc_2O_3$+0.5 mol % $CeO_2$+0.5 mol % $Y_2O_3$), remainder zirconia;
10Sc0.5Ce0.5Yb (10 mol % $Sc_2O_3$+0.5 mol % $CeO_2$+0.5 mol % $Yb_2O_3$), remainder zirconia;
10Sc0.5Ce1Y (10 mol % $Sc_2O_3$+0.5 mol % $CeO_2$+1 mol % $Y_2O_3$), remainder zirconia;
10Sc0.5Ce1Yb (10 mol % $Sc_2O_3$+0.5 mol % $CeO_2$+1 mol % $Yb_2O_3$), remainder zirconia; and
10Sc1Yb (10 mol % $Sc_2O_3$+1 mol % $Yb_2O_3$), remainder zirconia.

Embodiments of the electrolyte compositions have a high starting ionic conductivity of 0.14 S/cm or greater, preferably 0.15 S/cm or greater, such as 0.16 to 0.17 S/cm. The compositions of the present invention may experience less than 15% degradation in ionic conductivity with time, such as 0-15%, for example 0-10%, including 1-5%, in an air and/or in a $H_2$ containing environment after 4000 hours. Such minimization in ionic conductivity degradation may be due to stabilization of the cubic phase leading to suppression of the cubic to tetragonal phase transformation. Additionally, at least one of the embodiments of the present invention provides an electrolyte composition wherein the composition does not experience a cubic to rhombohedral phase transition at a temperature of about 25 to 850° C. In other words, the composition is cubic from room temperature to about 850° C. (i.e., the composition remains in the cubic phase from room to the SOFC operating temperature without generating tetragonal domains over time or transforming to the rhombohedral phase). Therefore, compositions of the present invention do not experience a degradation of ionic conductivity of greater than 15% after 4000 hrs and at a temperature of 850° C.

Figure 3:
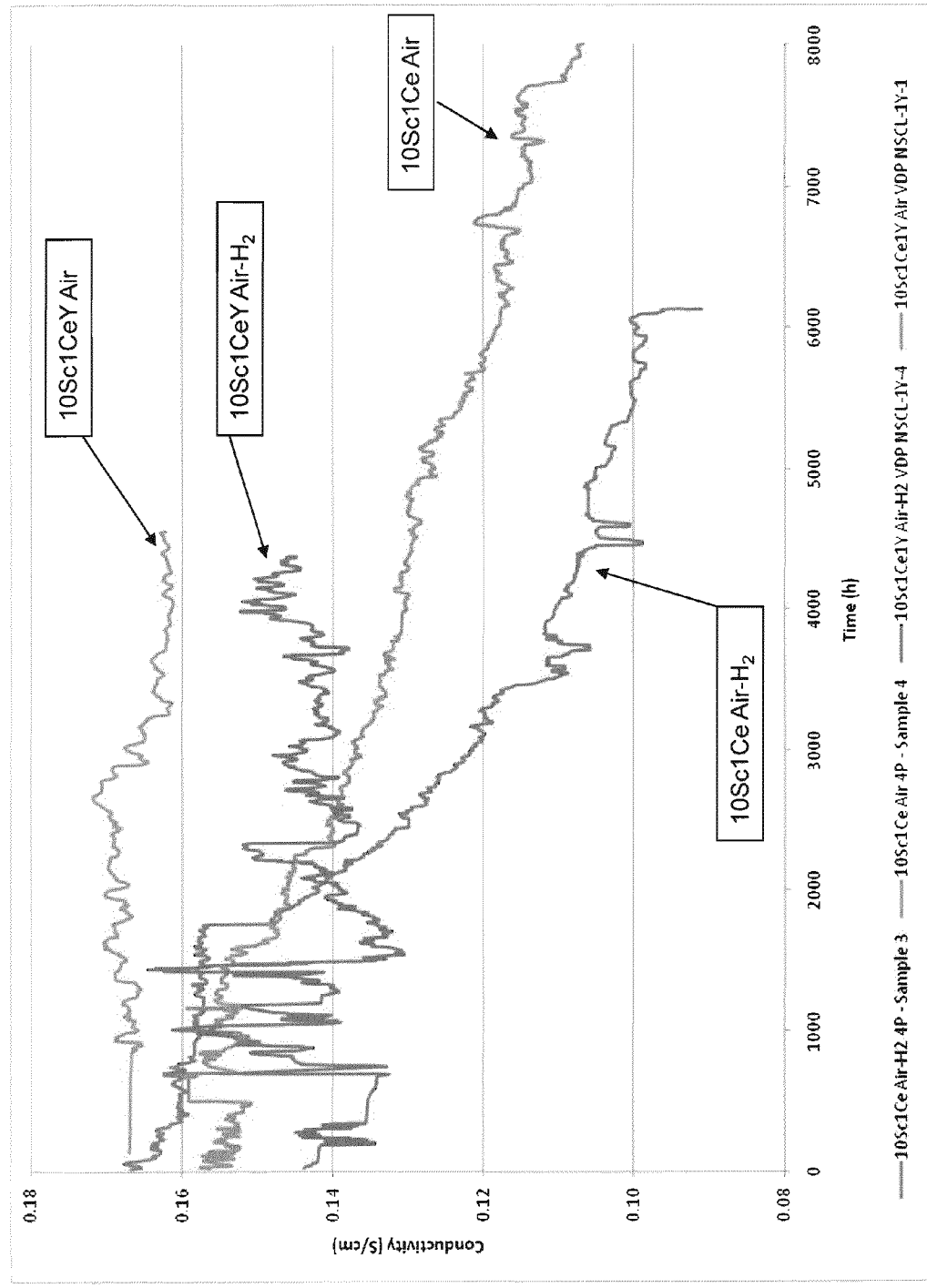
FIG. 3 is a graph showing ionic conductivity versus time for exemplary and comparative examples of stabilized zirconia electrolyte compositions.

For example, as shown in FIG. 3, conductivity measurements over time for comparative and exemplary composition samples were performed at 850° C. The conductivity of the samples were measured using a DC 4-point method with the Van der Pauw geometry. The samples were tested in a test stand capable of high temperature and controlled gas environment. Measurements were taken at 850° C. in either air or hydrogen environments. The exemplary samples comprised compositions of zirconia stabilized with 10 mol % of scandia, 1 mol % of ceria and 1 mol % of yttria ("10Sc1Ce1Y"). Conductivity measurements for one of the exemplary samples was conducted in a hydrogen atmosphere, and in air for the other sample. The comparative samples comprised compositions of zirconia stabilized with 10 mol % scandia and 1 mol % ceria ("10Sc1Ce"). The conductivity of the comparative compositions were measured in an air and a hydrogen atmosphere. As shown in FIG. 3, after 4000 hours, the comparative compositions of 10Sc1Ce experienced significant degradation in conductivity with time, for example, a degradation of greater than about 15%. However, the exemplary compositions of 10Sc1Ce1Y did not experience a degradation of ionic conductivity of greater than 15% after 4000 hrs in either air or hydrogen.

Figure 4:
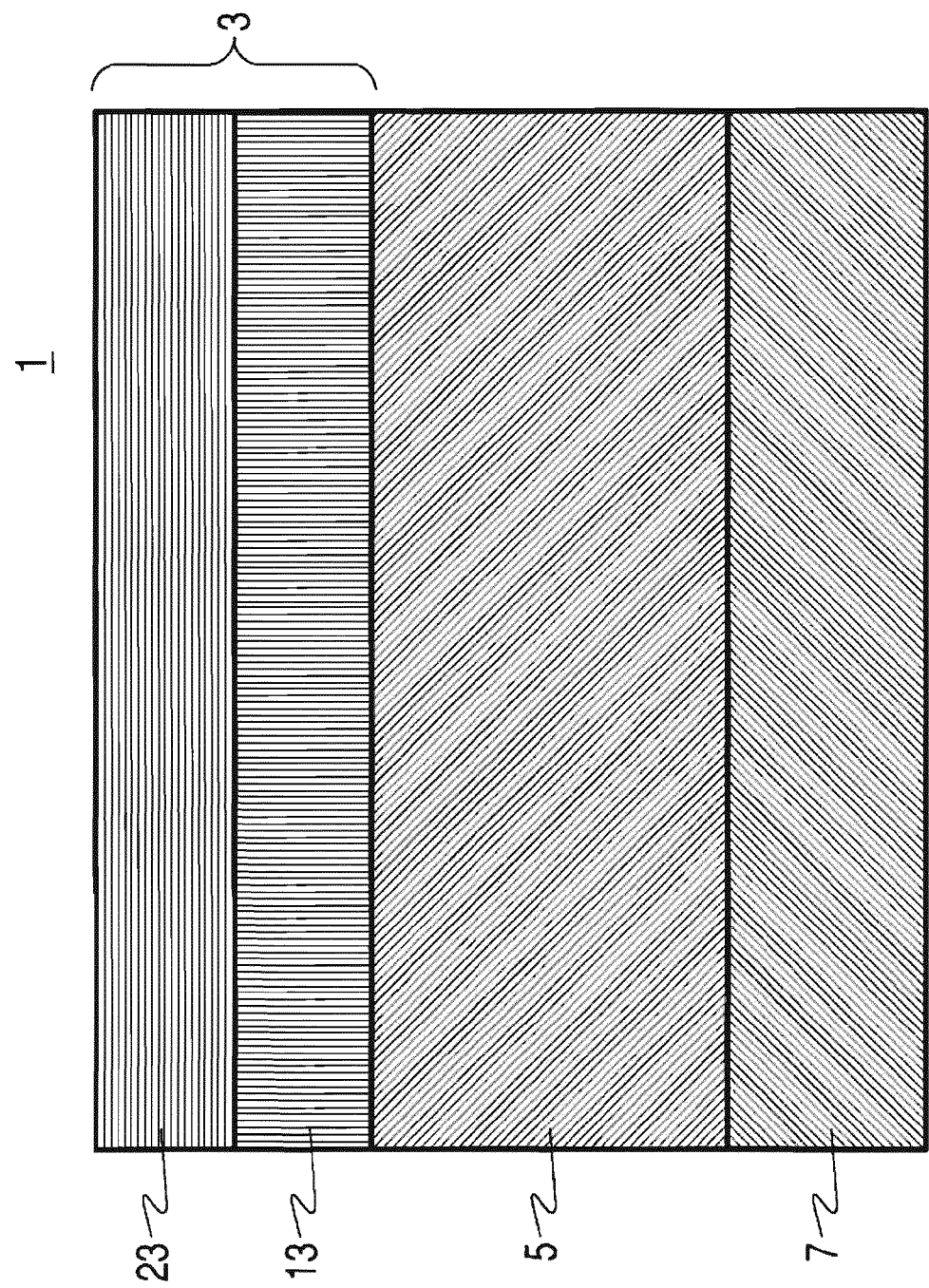

The embodiments of the present invention may be utilized as an electrolyte layer of a planar solid oxide fuel cell. In other words, the composition can be utilized as an electrolyte layer of a planar solid oxide fuel cell comprising an anode and a cathode. Preferably, the composition is used in an electrolyte supported cell where the electrolyte layer supports the anode and cathode. For example, FIG. 4 illustrates a solid oxide fuel cell 1 according to an embodiment of the invention. The cell 1 includes an anode electrode 3, a solid oxide electrolyte 5 and a cathode electrode 7. The electrolyte 5 may comprise a stabilized zirconia, such as zirconia stabilized with (i) scandia, (ii) ceria, and (iii) at least one of yttria and ytterbia, as described above. Alternatively, the electrolyte 5 may comprise an electrolyte composition comprising formula (1) and any of the embodiments that include the formula as described above.

A method of forming the planar, electrolyte supported SOFC 1 shown in FIG. 4 includes forming the cathode electrode 7 on a first side of a planar solid oxide electrolyte 5 and forming the anode electrode 3 on a second side of the planar solid oxide electrode. The anode and the cathode may be formed in any order on the opposite sides of the electrolyte.

As shown in FIG. 4, the anode electrode 3 may contain one layer or a plurality of sublayers. Thus, the anode electrode 3 may contain a first portion 13 and a second potion 23, each varying in composition and nickel content. For example, the first portion 13 is located between an electrolyte 5 and the second portion 23. The first portion 13 of the anode electrode may contain nickel and a ceramic phase, such as a stabilized zirconia and/or doped ceria, such as samaria doped ceria. The second portion 23 of the anode electrode may also contain nickel and a ceramic phase, such as a stabilized zirconia and/or doped ceria, such as samaria doped ceria. The first portion 13 may contain a lower ratio of the nickel containing phase to the ceramic phase than the second portion 23 of the anode electrode. The cathode electrode 7 may comprise an electrically conductive material, such as an electrically conductive perovskite material, such as lanthanum strontium manganite (LSM). Other conductive perovskites, such as LSCo, etc., or metals, such as Pt, may also be used. Compositions, orientations and configurations of the cathode and anode electrodes may comprise those discussed in co-pending U.S. patent application Ser. Nos. 11/907,204 and 11/785,034 which are hereby incorporated by reference in their entirety herein.

In another embodiment of the invention, the composition of the first, second and/or third embodiment comprising a zirconia stabilized with scandia, ceria, and at least one of yttria and ytterbia may be used in an anode electrode, a cathode electrode, or both electrodes of the solid oxide fuel cell. Thus, the composition of the first, second and third embodiments may be used in any one, two or all three of the SOFC anode, cathode and electrolyte. In the composite anode and/or cathode electrodes, the stabilized zirconia of the first, second or third embodiments is used as the solid oxide ionic conducting phase, while an electrically conductive material, such as a metal (e.g., nickel, copper, cobalt, platinum, palladium, etc. or their alloys) or an electrically conductive ceramic (e.g., lanthanum strontium manganite (LSM), lanthanum strontium cobaltite $(La,Sr)CoO_3$, lanthanum strontium cobalt ferrite $(La,Sr)(Co,Fe)O_3$, etc.,) is used as the electrically conducting phase. The degradation of ionic conductivity in the solid oxide ionic conducting phase of a composite electrode, such as the anode or cathode, will result in a degradation of the performance of the electrode. Therefore, composite electrodes containing a solid oxide ionic conducting phase with low ionic conductivity degradation, such as 10Sc1Ce1Y, will exhibit lower degradation as compared to composite electrodes containing a ceramic material having a higher degradation rate.

For example, the zirconia stabilized with scandia, ceria, and at least one of yttria and ytterbia may be used in a single layer or a multi-layer composite anode electrode. For example, the zirconia stabilized with scandia, ceria, and at least one of yttria and ytterbia may be used in the first portion 13 and/or the second portion 23 of the anode electrode 3 described above. The first portion 13 of the anode electrode may contain nickel and the stabilized zirconia ceramic phase. The second portion 23 of the anode electrode may also contain nickel and the stabilized zirconia ceramic phase. The first portion 13 may contain a lower ratio of the nickel containing phase to the ceramic phase than the second portion 23 of the anode electrode. For example, the first portion 13 of the anode electrode may contain a porosity of 5-30 volume percent and a nickel phase content of 1 to 20 volume percent and remainder the stabilized zirconia ceramic phase. The second portion 23 of the anode electrode may contain a higher porosity of 31 to 60 volume percent, a nickel phase content of 21 to 60 volume percent and remainder the stabilized zirconia ceramic phase. The nickel containing phase may optionally contain between 1 and 50 atomic percent, such as 5-30 at % of an additional metal, such as cobalt and/or copper, and the balance nickel.

In another example, the cathode electrode 7 may comprise a composite cathode containing the electrically conductive phase, such as an electrically conductive perovskite material (e.g., LSM) of 10 to 70 volume percent and remainder porosity and the stabilized zirconia ionically conductive phase.

In another embodiment of the present invention, a method of operating a solid oxide fuel cell, for example, the fuel cell 1 of FIG. 4, comprises operating the fuel cell for at least 4000 hrs such that the SSZ electrolyte of the fuel cell does not experience a degradation of ionic conductivity of greater than 15%. Preferably, the electrolyte composition is cubic from room temperature to about 850° C. and after operating at 850° C. for at least 4000 hours in air and hydrogen ambient provided on the cathode and anode side of the electrolyte (i.e., the composition remains in the cubic phase from room temperature to the SOFC operating temperature without generating tetragonal domains over at least 4000 hours or transforming to the rhombohedral phase).

Fuel cell stacks are frequently built from a multiplicity of SOFC's 1 in the form of planar elements, tubes, or other geometries. Fuel and air has to be provided to the electrochemically active surface, which can be large. The stack may comprise a plurality of planar or plate shaped fuel cells. The fuel cells may have other configurations, such as tubular. The stacks may be vertically oriented stacks or the fuel cells may be stacked horizontally or in any other suitable direction between vertical and horizontal. A plurality of interconnects are located in the stack, such that each fuel cell is located between two interconnects, and each interconnect acts as a gas separator plate, as described in the above mentioned U.S. application Ser. Nos. 11/907,204 and 11/785,034.

Frequently, the interconnect 9 which electrically connects the fuel electrode 3 of one cell to the air electrode 7 of the adjacent cell is also used as the gas flow separator plate 9, as shown in FIG. 5. The gas flow separator plate separates fuel, such as a hydrocarbon fuel, flowing to the fuel electrode (i.e., anode 3) of one cell in the stack from oxidant, such as air, flowing to the air electrode (i.e., cathode 7) of an adjacent cell in the stack. The separator 9 contains gas flow passages or channels 8 between the ribs 10. In this case, the gas flow separator plate which functions as an interconnect is made of or contains electrically conductive material. An electrically conductive contact layer, such as a nickel contact layer, may be provided between the anode electrode and the interconnect. FIG. 5 shows that the lower SOFC 1 is located between two gas separator plates 9.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity, such as a column. In this case, the electrical power output from both stacks cannot be separately controlled.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A scandia stabilized zirconia electrolyte composition for a solid oxide fuel cell, comprising a formula $(ZrO_2)_{1-w-x-a-b}(Sc_2O_3)_w(CeO_2)_x(Y_2O_3)_a(Yb_2O_3)_b$, where $0.09 \leq w \leq 0.11$; $0 < x \leq 0.025$; $a+b=z$; $0 \leq z \leq 0.025$; and $x+z \geq 0.02$, wherein:
   $w=0.1$; $x=0.01$; and $z=0.01$; and
   the composition comprises zirconia containing 10 mol % $Sc_2O_3$, 1 mol % $CeO_2$ and 1 mol % $Y_2O_3$.

2. The electrolyte composition of claim 1, wherein:
   the composition does not experience a degradation of ionic conductivity of greater than 15% after 4000 hrs and at a temperature of 850° C.;
   the composition comprises a cubic phase which substantially lacks tetragonal phase domains after operating in a solid oxide fuel cell at 850° C. for at least 4000 hours in at least one of air or hydrogen ambient; and
   the composition does not experience a cubic to rhombohedral phase transition at a temperature of about 25 to 850° C.

3. The composition of claim 1, wherein the composition is utilized as an electrolyte layer of a planar solid oxide fuel cell comprising an anode and a cathode, and the electrolyte layer supports the anode and cathode.

* * * * *